US 6,399,944 B1

(12) United States Patent
Vasilyev et al.

(10) Patent No.: US 6,399,944 B1
(45) Date of Patent: Jun. 4, 2002

(54) MEASUREMENT OF FILM THICKNESS BY INELASTIC ELECTRON SCATTERING

(75) Inventors: Leonid A. Vasilyev, Sunnyvale; Charles E. Bryson, III; Robert Linder, both of Santa Clara; Sergey Borodyansky, Sunnyvale; Dmitri Klyachko, Cupertino, all of CA (US)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 09/350,701

(22) Filed: Jul. 9, 1999

(51) Int. Cl.$^7$ .............................................. H01J 37/073
(52) U.S. Cl. ...................... 250/310; 250/305; 250/307
(58) Field of Search ................................ 250/307, 310, 250/305

(56) References Cited

U.S. PATENT DOCUMENTS

| 4,766,034 A | * | 8/1988 | Sato et al. .................... 428/336 |
| 5,280,176 A | | 1/1994 | Jach et al. .................... 250/305 |
| 5,594,245 A | * | 1/1997 | Todokoro et al. ........... 250/310 |
| 6,067,154 A | * | 5/2000 | Hossain et al. ........... 356/237.2 |

FOREIGN PATENT DOCUMENTS

| DE | 26 11 411 A | | 9/1977 |
| EP | 859406 A2 | * | 8/1998 |
| GB | 2 054 136 A | | 2/1981 |

OTHER PUBLICATIONS

Briggs et al.; "Auger and X–Ray Photoelectron Spectroscopy"; Practical Surface Analysis; vol. 1; 2$^{nd}$ edition; Wiley, 1990. pp. 19–83.
Goulet et al.; "A Procedure for Determining Low–Energy (<10EV) Electron Mean Free Paths in Molecular Solids: Benzene"; Journal of Electron Spectroscopy and Related Phenomena; 41 (1986) pp. 157–166.
Michaud et al.; "Total cross sections for slow–electron (1–20 eV) scattering in solid $H_2O$"; The American Physical Society; vol. 36; No. 10; Nov. 15, 1987; pp. 4672–4683.
Bronshtein, et al.; "Inelastic Scattering of Electrons and Secondary–Electron Emission in Certain Metals. II"; Fizika Tverdogo Tela; vol. 1; No. 10; Oct., 1959; pp. 1375–1382.
Goulet et al.; "Probabilistic description of particle transport. I. General theory of quasielastic scattering in plane–parallel media"; The American Physical Society; vol. 37; No. 6; Mar. 15, 1988; pp. 2176–2182.
Bronshtein et al.; "Study of Secondary Electron Emission from Solids with Obliquely Incident Primary Electrons"; Fizika Tverdogo Tela; vol. 7; No. 6; Jun., 1965; pp. 1484–1491.
Matthew et al.; "The Spectral Background in Electron Excited Auger Electron Spectroscopy"; ? Surface and Interface Analysis, vol. 11, 1988, pp. 173–181.
Bronshtein, et al.; "Inelastic Scattering of Electrons and Secondary–Electron Emission in Certain Metals. I"; Fizika Tverdogo Tela; vol. 1; No. 10; Apr., 1960; pp. 1365–1374.

* cited by examiner

Primary Examiner—Bruce Anderson
(74) Attorney, Agent, or Firm—Michael O. Scheinberg

(57) ABSTRACT

A method and apparatus for measuring the thickness of a thin coating, having a thickness on the order of 1 to 10 nm, of one material formed over a substrate of another material of significantly different atomic number, for example, a carbon coating on a ferromagnetic substrate. A primary radiation source, for example, of electrons or X-ray, creates low-energy secondary electrons in the substrate. The intensity of inelastically scattered electrons generally increases with film thickness. The secondary electron spectrum measured for a test sample is compared with the spectra for a plurality of similar reference samples of the same set of compositions, and a test thickness is thereby determined. The method may be practice on conventional electron spectrometers with the addition of some programmed analysis. Various techniques are available for extracting the data and comparing the test and reference data.

20 Claims, 4 Drawing Sheets

MEASUREMENT OF FILM THICKNESS BY INELASTIC ELECTRON SCATTERING

FIELD OF THE INVENTION

The invention relates generally to the measurement of film thicknesses. The invention relates particularly to such measurement using an electron analyzer.

BACKGROUND ART

Many technologically advanced devices rely upon composite structures having a very thin, substantially planar film covering a substrate of another material. An example of such a device is a magnetic recording or read head which has an active surface layer of a ferromagnetic material. High-performance ferromagnetic materials based on, for example, heavier elements such as cobalt, are often brittle and subject to oxidation so that it is common practice to cover the ferromagnetic layer with a very thin protective layer, often of a carbon-based material such as diamond. However, the performance and durability of such devices depend on the manufacturing process to produce a thickness of the covering layer within a relatively narrow range. If the structure is an electromagnetic sensor, the coating thickness must be closely controlled so as to not degrade the sensor performance.

Many thickness measurement techniques are available to measure such film thicknesses, which often are in the range of 1 to 150 nm. Optical techniques are simple, but their dependence on optical properties of both the film and substrate preclude their use for some combination. Auger electron spectroscopy, to be described below, is commonly used for compositional control and in principle can be used for measuring film thickness. However, it is entirely too slow for use in a production environment if the film thickness exceeds 3 nm and is practically useless at thicknesses above 5 nm. Scanning electron microscopy is straightforward, but it is a very slow process and requires the sectioning of the sample being tested. Frequent sampling in a production environment requires a fast, non-destructive technique.

Electron spectroscopy is a well known technique for characterizing the atomic constituents in a solid. Briggs et al. have edited a complete reference in *Practical Surface Analysis, vol. 1, Auger and X-ray Photoelectron Spectroscopy*, $2^{nd}$ ed., (Wiley, 1990). In the typical practice of Auger spectroscopy, the solid is probed with an electron beam in the low keV range of energies and produces a secondary electron through an Auger transition process having a well defined Auger energy $E_{AUGER}$. In Auger spectroscopy, the probing radiation ejects an inner-shell electron from an atom. Then in the Auger transition, a first outer-shell electron falls into the inner-shell vacancy and a second outer-shell electron is ejected carrying the difference in energy. The spectrometer analyzes the energy of the ejected electron as the Auger energy $E_{AUGER}$. The Auger energy $E_{AUGER}$ is for the most part unique for each atom, primarily dependent upon the atomic number Z. Thus, the measured electron energy can be used to determine the composition of the material, at least near its surface. These energies are generally in the range of a few hundred eV to a few keV for the typical practice of Auger electron spectroscopy. Usually to enhance the Auger signal, the primary energy Ep is made twice or more the Auger energy $E_{AUGER}$. Auger electron spectroscopy allows the very quick and highly accurate measurement of film thicknesses up to about 30 nm. Other types of electron spectroscopy are possible with similar equipment, and the technology is close to electron microscopy.

A generic electron spectrometer is schematically illustrated in FIG. 1. Other geometrical relationships may be used. An electron gun 10 emits a primary radiation beam 12 of energy $E_p$ towards a sample 14 under test, which is supported on a holder 15. An electron energy analyzer 16 receives a beam 18 of secondary electrons emitted from the sample 14 and characterized by energy $E_s$. The low electron energies require that the entire analyzer be operated at very high vacuum levels. The secondary beam 18 tends to be spatially very broad. The electron energy analyzer 16 typically has a spatially fixed entrance slit 20 to fix the angle between the analyzer 16 and the sample 14, and it internally analyzes the secondary energy $E_s$ by means of a electrostatic retarder or a magnetic analyzer or other means. Although in some automated applications, the electron analyzer 16 outputs a small number of experimentally determined parameters, the typical analyzer at some level outputs an energy spectrum from which the energy location of one or more peaks is extracted. Such electron spectrometers are well known, very often as Auger or ESCA spectrometers, and are commercially available from several sources, including Physical Electronics (PHI), a division of Perkin-Elmer of Eden Prairie, Minn., Vacuum Generators of the United Kingdom, and Omicron of Delaware.

Although electrons are often used as the probing radiation, other types of radiation can By produce similar effects, for example, X-ray or positrons.

One of the major experimental effects in electron spectroscopy is background noise introduced by inelastic scattering of the primary electrons (if an electron source is used) and of secondary electrons as they pass through the material between its surface and their points of interaction with the constituent atoms of the material. All electrons experience both elastic and inelastic collisions. Inelastically scattered electrons have a wide distribution of energies beginning at the energy $E_p$ of the probing beam and extending downwardly.

Primary electrons used for Auger spectroscopy typically have energies of a few keV while the Auger transitions are typically below 1 keV. A 1 keV electron has a mean free path in a solid of about 3 nm; a 3 keV electron, 15 nm. X-rays exhibit significantly deeper penetration. Furthermore, secondary Auger electrons are subject to the same type of inelastic scattering. Many technical articles have attempted to explain and quantify the effects of inelastic scattering in order to extract the Auger spectrum. Other technical articles have used the inelastic spreading as a way of measuring the scattering cross-sections between electrons. Elastic scattering depends upon the average atomic number Z of the material and is stronger in materials with higher Z.

SUMMARY OF THE INVENTION

A method and apparatus for quickly and non-destructively determining the thickness of an overlayer of one material formed over an underlayer of another material having a different effective atomic number. A source of primary radiation, for example, keV electrons or X-rays, creates a wide spectrum of inelastically scattered secondary electrons. The spectrum of secondary electrons emitted through the overlayer of a test sample is measured and compared to similar spectra for reference samples having known thicknesses of the overlayer to thereby determine the overlayer thickness in the test sample. The apparatus may be derived, in the case of electrons being the primary radiation, from conventional electron spectrometers.

In one embodiment of the invention, ratios of the intensity of a portion of the spectrum of inelastically scattered electrons to that of elastically scattered electrons are measured both for the reference and test samples.

DETAILED DESCRIPTION OF THE PREFERRED EMBODIMENTS

Figure 3:
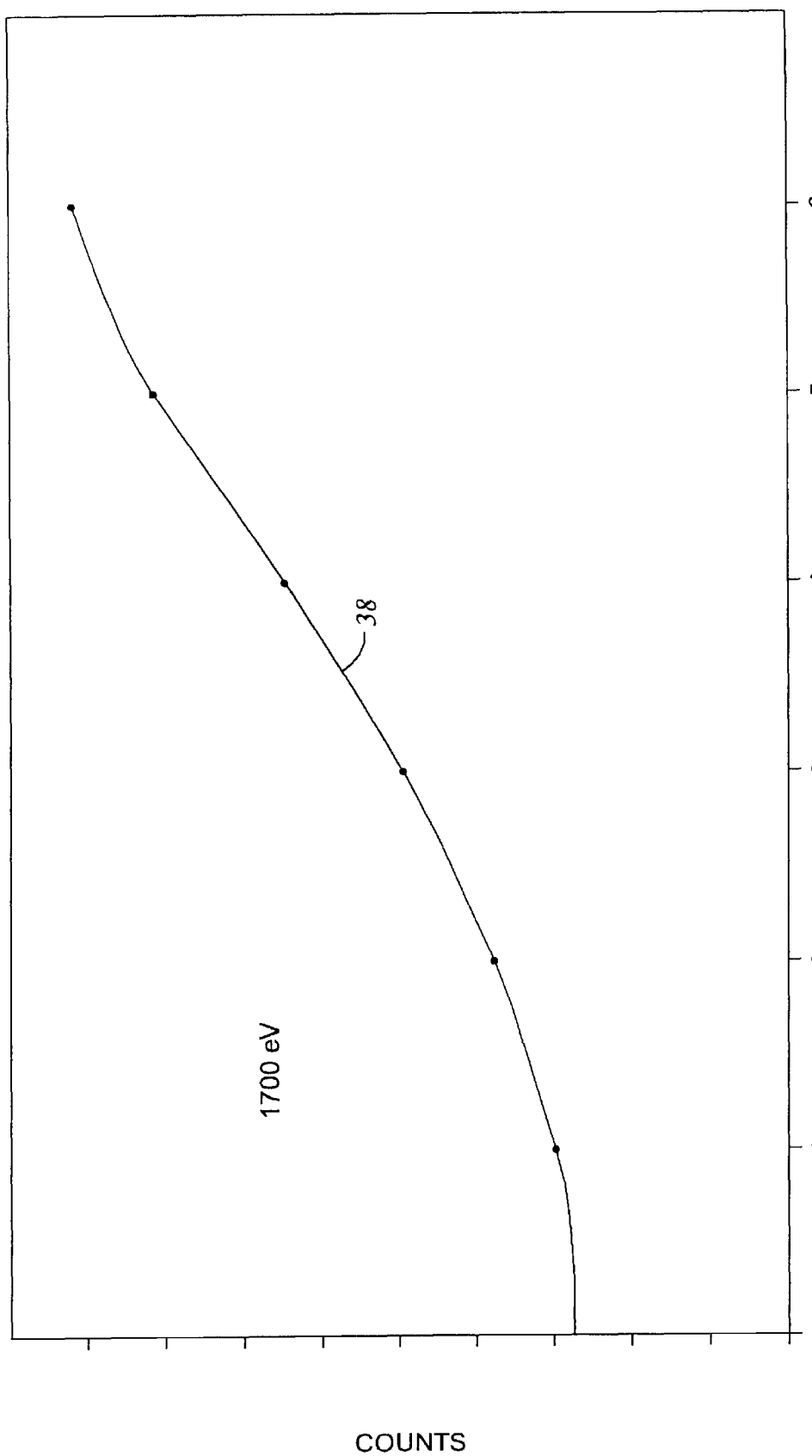
FIG. 3 is a graph of the relationship between the spectral intensity at a fixed energy in FIG. 2 with the coating thickness.
Figure 5:
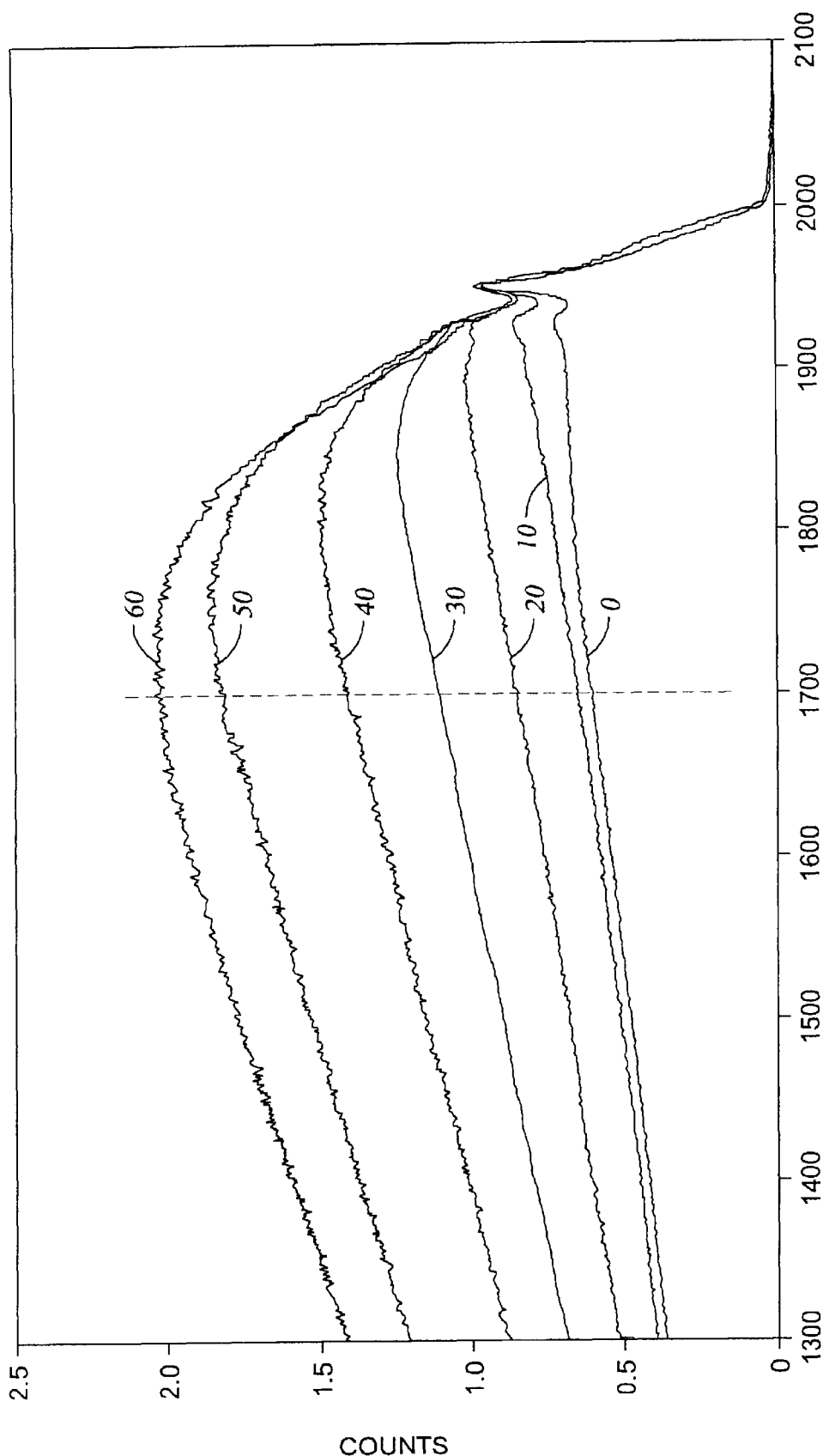

Under the proper conditions, the spectrum for inelastically scattered, secondary electrons provides a fast non-destructive method of determining the thickness of a thin layer deposited on a substrate having a significantly different atomic number. Electron spectra are illustrated in FIG. 3 for several different thicknesses of a carbon-based film deposited on a magnetic substrate composed of heavier ferromagnetic transition elements such as manganese, iron, cobalt, nickel, etc., with perhaps significant fractions of heavy rare-earth elements, such as neodymium and samarium. The intensity scale is in arbitrary units and reflects the fact that the secondary electron flux is energy analyzed before being detected by an electron counter, such as an electron multiplier tube. However, the illustrated spectra have been normalized to the intensity of a peak 30 associated with elastic scattering of the primary electron.

Carbon has an atomic number of 6 while the four cited transition elements have atomic numbers between 25 and 28. The rare-earth elements are much heavier yet.

For a primary electron energy $E_p$ of 2 keV, the unillustrated transition metal Auger peaks are in the range of 700 to 800 eV, that is, far below the illustrated energy range. These Auger peaks are easily resolved at coating thicknesses of 3 nm or less, but, for thicker coatings, the inelastic scattering introduces major difficulty in extracting the Auger peaks.

The inelastic scattering produces noise-like spectra at energies between the Auger peaks and the primary electron energy. In the illustrated example, the elastic peak 30 at about 1.95 keV corresponds to the primary electron energy. A minimum 32 at least for the thinner coatings separates the elastic peak 30 and a broad distribution for inelastically scattered electrons. Typically in Auger spectroscopy, the optics are adjusted to produce a very narrow, intense elastic peak 30 that is substantially higher than the inelastic spectra. The inelastic spectra have been emphasized in FIG. 2 by detuning the spectrometer.

Figure 2:
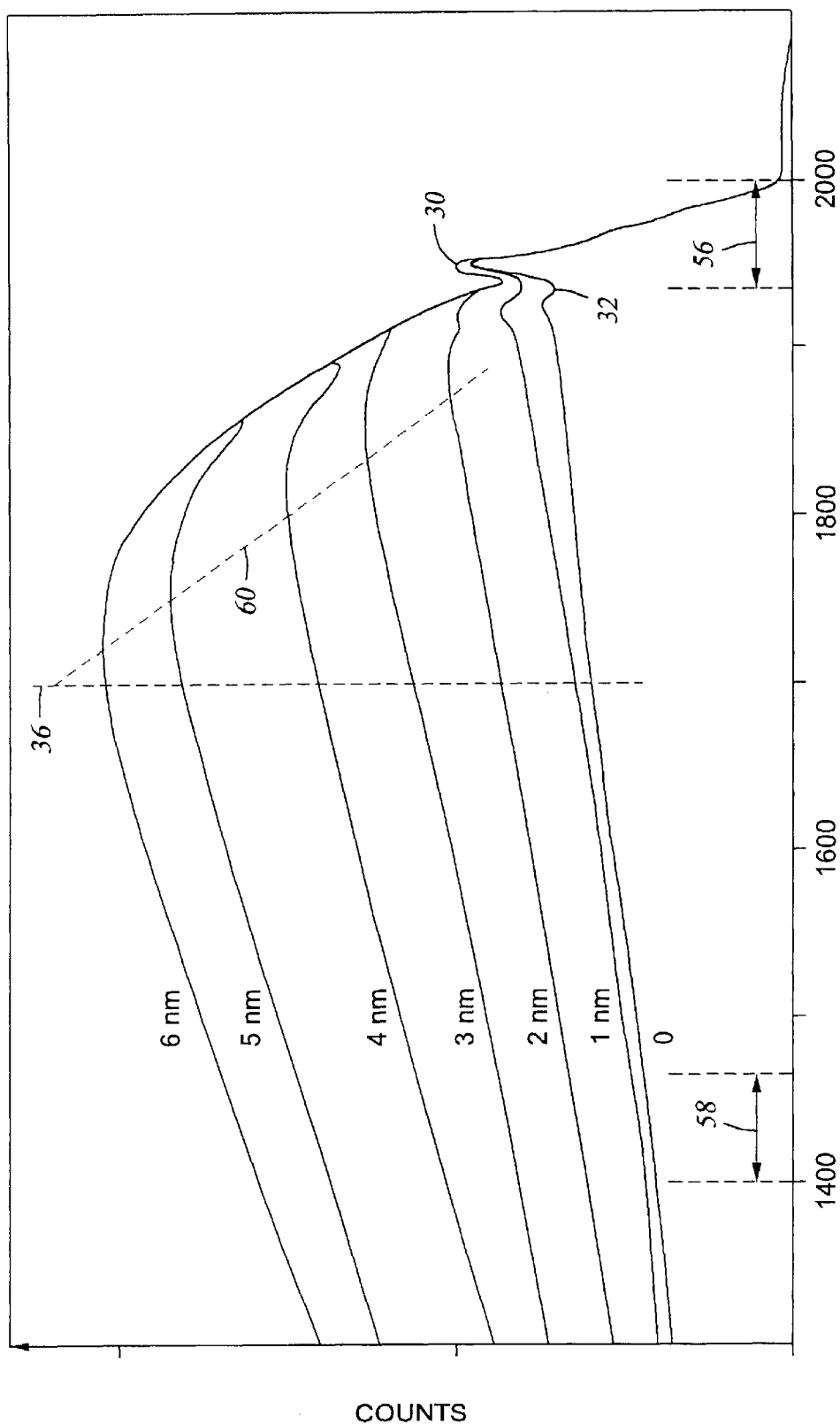
FIG. 2 is a graph of the relationship of secondary electron spectra including inelastic scattering and the thickness of a over coating.

As illustrated, the relative intensity of the inelastic spectra versus that of the elastic peak increases in a regular fashion with increasing carbon film thickness between 0 and 6 nm. The illustrated data are normalized to a unity intensity of the elastic peak 30. If the intensity is measured at a fixed secondary electron energy away from the elastic peak 30, that intensity is a measure of the film thickness. For example, the intensity at 1700 eV along an isoenergy line 36 of FIG. 2 is plotted as curve 38 in FIG. 3 for the various film thicknesses. Under the same measurement conditions, the value of second electron intensity is correlated with the coating thickness.

Figure 4:
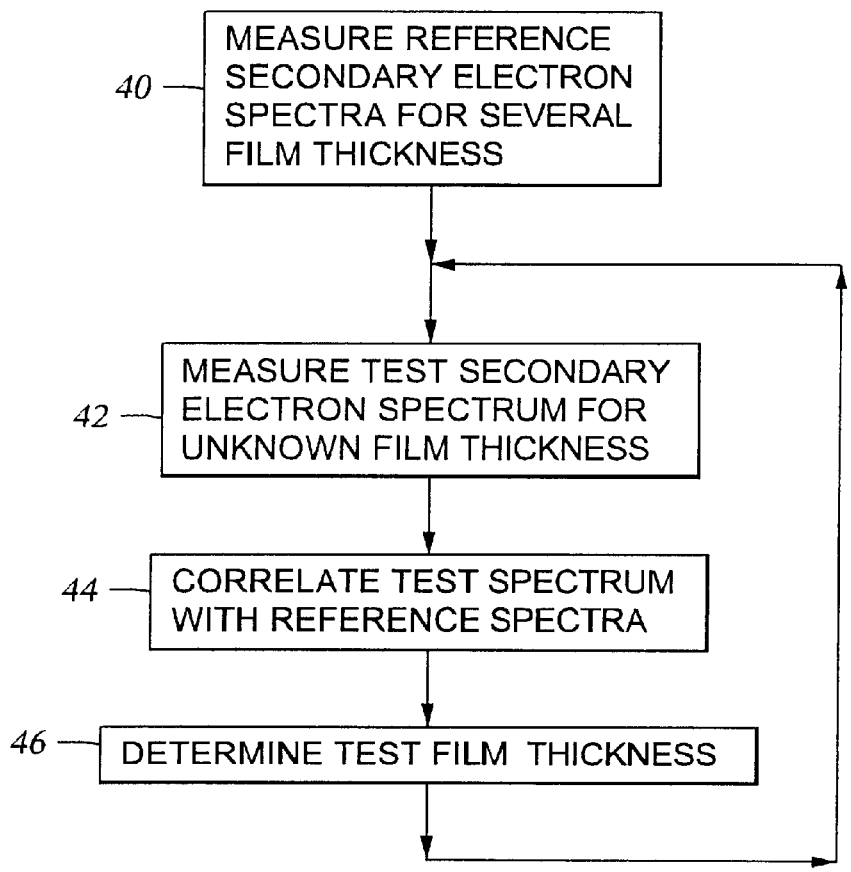
FIG. 4 is a flow diagram of using secondary electron spectra to determine the thickness of the over coating.

As a result, a method in one embodiment of invention of measuring an unknown film thickness is illustrated in the flow diagram of FIG. 4. In step 40, a number of reference samples are prepared having a coating composed of a first material, having one of several known thicknesses, and covering a substrate of a second material. The combination of the two materials should be the same or at least close to the material combination for the samples to be tested. Also, the excitation beam energy and the spectrometer's resolution should be the same in the thickness measurement as in the calibration. The thicknesses should span the expected range of thicknesses to be experienced in testing. In the example presented in FIG. 2, the thicknesses ranged from zero (no coating) to 60 nm in approximately 10 nm increments. In establishing the reference spectra, the coating thicknesses can be measured by any known technique, including scanning electron micrographs of sectioned samples, since they need to be measured only once in establishing the reference spectra and calibrating the measurement of the test samples.

In a continuation of the calibration step 40, a secondary electron energy spectrum is measured for each sample of known coating thickness. Conceptually, following the example of FIG. 3, the intensity of only a single energy needs to be measured. However, a broader spectrum is preferred, both to establish the validity of the data and to use more sophisticated parameter extraction, as will be described later. The multiple reference spectra are saved or analyzed to produce a smaller set of parameters, which are saved for use with later acquired test spectra.

In step 42, a secondary electron spectrum is measured for a test sample having a unknown coating thickness. The test sample should have the same combination of substrate and coating compositions as the reference samples. This is a non-destructive test which can be performed relatively quickly as an adjunct to a production line.

In step 44, the test spectrum obtained in step 42 is correlated with the reference spectra obtained in step 40. In the simple intensity model of FIG. 3, this correlation need only determine the intensity for the test spectrum at the same energy as was done for the reference spectra (1700 eV in FIG. 3) with perhaps a multiplicative constant to reflect differences in measurement duration or primary beam intensity.

In step 46, the coating thickness is determined from the results of the test spectrum. In the simple example of FIG. 3, the illustrated curve 38 relates the measured intensity at 1700 eV with the film thickness.

After the coating thickness has been determined for one test sample, another test sample having the sample combination of materials can be tested without a need to repeat the measurement of the reference spectra.

The above example assumes that the inelastic spectra result from inelastic scattering of the primary electrons. Advantageously, the measured spectrum is between the elastic peak and the Auger peaks. Similar results are obtained when the inelastic spectra are measured for inelastic scattering of the Auger electrons. In this case, the inelastic spectra extend to lower energies than the Auger energy.

The inventive thickness measurement depends upon the effective atomic mass Z of the coating being substantially different from that of the substrate underlying the coating. This difference causes very significant differences in the ratio between the elastic and inelastic scattering, which can be detected as a relative background-to-elastic ratio at an energy far enough away from the elastic peak. In general, high-Z materials favor elastic scattering of electrons. In the case of a carbon-based coating over a transition metal substrate (low Z over high Z), the inelastic spectrum arises from the coating. In the case of high Z over low Z, inelastic scattering in the substrate is moderated by elastic scattering in the coating. The coating and substrate may have some overlapping elemental compositions, but the invention is still applicable if two separated portions of the periodic table are separately represented by substantial fractions in the two layers. It is further appreciated that the substrate may be a layer having a thickness of at least approximately the relevant electron absorption or scattering length.

Figure 1:
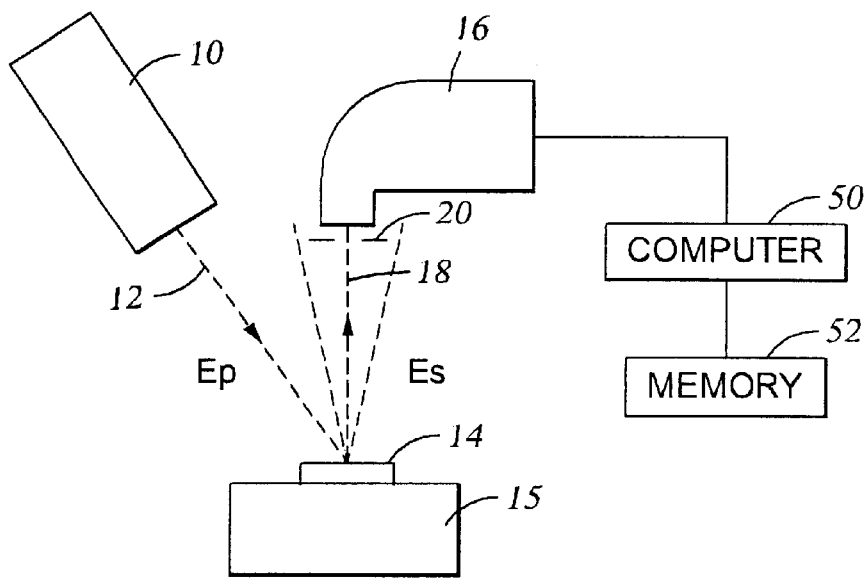
FIG. 1 is a schematic representation of an electron spectrometer.

The inventive method can be practiced on the already described conventional analyzer of FIG. 1 with the addition of some computational and control capabilities. A computer 50 receives the output of the electron energy analyzer 16 and uses it to calculate the characteristics of the electron spectra used in quantifying the film thickness. In the three analysis examples described below, the single characteristic is either the intensity at a fixed energy, its ratio to the elastic peak, or the energy of the peak. More than one characteristic may be used. A memory 52 such as semiconductor memory or a magnetic disk or other type of other available data storage device or medium is associated with the computer 50 and stores for each of the reference coatings both the thickness of the reference coatings and the values of the thickness characteristics for all the reference coatings. When a test sample is measured, the computer 50 not only calculates its characteristic values, but also then correlates those values with those of the reference coatings stored in the memory 52 so as to determine the coating thickness of the test sample. The computer 50 outputs the value of experimentally determined coating thickness.

The computer 50 and memory 52 may be part of the control instrumentation already provided for the conventional analyzer with additional software written to perform the required control and calculations. Alternatively, the spectra established by the electron analyzer may be downloaded to a separate computer for contemporaneous or delayed calculation of coating thickness. It is appreciated that the reference data need not be stored in tabular form but may be represented by parameters for curve fitting the reference data or by other data representations linking the electron spectra to coating thickness. The same apparatus with additional programming may be used to establish the reference spectra.

The single-energy correlation provided by the curve 38 of FIG. 3 is not preferred. The measured intensities are subject to variations that are not easy to measure or control, including noise of various sorts. The vast majority of the energy spectra are ignored. A more complex data reduction using more measured points is preferred. For example, as suggested by the normalization of the spectra of FIG. 2, the ratio may be taken of inelastic data to inelastic data for both the reference and test samples, and the ratios are compared in determining the coating thickness for the test sample. In particular, the elastic peak may be measured by integrating the spectra across an energy band 56, illustrated in FIG. 2, extending from the minimum 32 at about 1930 eV to the primary energy $E_p$ at 2000 eV. Similarly, the inelastic scattering may be measured by integrating the spectra across an energy band 58 of similar width but lower energy, for example, around 1300 eV. Preferably, in the case of low Z over high Z, the inelastic energy band 58 is above 50% of the primary energy $E_p$, and more preferably in a range about 20 to 30% lower than the primary energy. The ratios of the two intensities will exhibit a behavior similar to that of FIG. 3. However, use of the ratios suppresses noise, common instrumental drift, and differing measurement periods.

In another approach, the reference spectra of FIG. 2, at least for thicker coatings, exhibit peaks in energy which vary with coating thickness along line 60. The peak positions for both reference and test samples can be obtained by curve fitting a large number of points in each spectrum. Advantageously, the peak position is relatively insensitive to variations in equipment characteristics and operation as long as the relative geometries remain the same and the energy accuracy is maintained. Thus, the peak position for the test sample can correlated with the thickness of coatings in the reference samples.

Other and possibly more complex curve fitting can be performed to extract the coating thickness from the reference data.

The described example of the invention depends upon the primary radiation and its absorption length than the secondary electrons created by the primary radiation. The relative intensity of elastic scattering in the secondary spectrum of the overlayer must differ significantly from that in the secondary spectrum of the underlayer. This condition is usually satisfied by the two materials having significantly different atomic masses on average. In the described embodiment, the overlayer has a lower atomic mass than does the underlayer. The smoothly varying secondary scattering spectra of FIG. 2 result from the measured electron energies being no more 90% of the primary electron energy but being above the Auger energy in both the coating and the substrate. The thickness of the film being measured should not be significantly greater than the scattering length for either the initial or the scattered secondary electrons in that material because otherwise few electrons would reach the surface. The energy of the probing electrons or X-rays or other radiation may be adjusted in view of the anticipated thicknesses of the coating so that a substantial portion of the probing radiation reaches through the coating.

The invention thus provides a quick and non-destructive test of the thickness of a coating. It can be practiced on conventional spectroscopic equipment with only straightforward and simple modifications.

Although the invention has been described with reference to inelastic scattering of Auger electrons, the invention is not necessarily so limited.

What is claimed is:

1. A method of measuring a thickness of a film of first composition formed over a material of a second composition, comprising the steps of:

provided a plurality of reference samples, each having a film of said first composition and of known thickness formed over a material of said second composition;

for each of said reference samples, measuring a secondary electron spectrum emitted therefrom by being excited by a type of primary radiation, thereby obtaining a plurality of reference secondary electron spectra, each reference spectrum identified with a film thickness and including energy regions dominated by inelastic scattering;

for a test sample having a film of said first composition formed over a material of said secondary composition, measuring a second electron spectrum emitted therefrom by being excited by said type of primary radiation, thereby obtaining a test secondary electron spectrum including an energy region dominated by inelastic scattering; and by comparing one or more regions dominated by inelastic scattering in said test secondary electron spectrum with one or more regions dominated by inelastic scattering in said reference secondary electron spectra, determining a thickness of the film of the test sample.

2. The method of claim 1, wherein said type of primary radiation comprises electrons.

3. The method of claim 1, wherein said type of primary radiation comprises X-rays.

4. The method of claim 1, wherein said film comprises a carbon-based coating and said substrate comprises a ferromagnetic material.

5. The method of claim 4, wherein said ferromagnetic material comprises cobalt.

6. A method of measuring the thickness in a sample of a coating of a first material formed over a second material, comprising the steps of:

irradiating a test sample with electrons having a primary energy;

measuring at least one intensity of electrons emitted from said test sample in response to said irradiating step at at least one energy level less than said primary energy; and comparing said measured intensity with prerecorded data relating intensities of electrons emitted from reference samples having a respective coating of said first material and having a respective one of a plurality of known thicknesses over said second material when said reference samples are irradiated with electrons having said primary energy, the thickness of the coating of the first material of the test sample being derived from the known thickness or thicknesses of the reference sample or samples having an electron intensity or intensities best matching that of the test sample.

7. The method of claim 6, wherein said measuring step measures said intensity in an energy band extending between 10 and 50% below said primary energy.

8. The method of claim 7, wherein said energy band is above an Auger energy of said electrons in said coating.

9. The method of claim 6 in which:

measuring at least one intensity of electrons emitted from said test sample includes measuring at least one intensity of electrons in an energy region including primarily inelastically scattered secondary electrons; and comparing said measured intensity with prerecorded data relating intensities of electrons emitted from reference samples includes comparing said measured intensity with prerecorded data relating intensities of electrons in an energy region including primary inelastically scattered secondary electrons.

10. A film thickness analyzer, comprising:

a source of primary radiation incident upon the test sample;

an electron energy analyzer receiving radiation from the test sample, the radiation including inelastically scattered electrons;

a computer accessible memory storing, for each of a plurality of reference samples, said at least one characteristic value derived from measurements of inelastically scattered electrons and correlated to a respective thickness of a coating of said reference samples;

a processor programmed to receive an output of said electron energy analyzer, produce at least one characteristic value corresponding to inelastically scattered electrons from said first sample, and to correlated the at least one characteristic value for the test sample with the at least one characteristic value of the reference samples, thereby determining a thickness of a coating of the test sample.

11. The analyzer of claim 10, wherein said source of primary radiation is an electron source.

12. The analyzer of claim 11, wherein said electron source emits electrons within an energy band including 2 keV.

13. The film thickness analyzer of claim 10 in which:

the computer accessible memory stores, for each of a plurality of reference samples, at least one characteristic value derived from measurements of inelastically scattered secondary electrons having energy levels of between 10% and 50% lower than the primary radiation that gave rise to the secondary electrons; and the processor programed to receive an output of said electron energy analyzer is programmed to produce at least one characteristic value corresponding to inelastically scattered secondary electrons having energy levels of between 10% and 50% lower than the primary radiation that gave rise to the secondary electrons or an energy spectrum of inelastically scatted secondary electrons having energy levels of between 10% and 50% lower than the primary radiation that gave rise to the secondary electrons, and to correlated the at least one characteristic value for the reference samples, thereby determining a thickness of a coating of the test sample.

14. The film thickness analyzer of claim 10 in which the processor programmed to receive an output of said electron energy analyzer and produce at least one characteristic value corresponding to inelastically scattered secondary electrons is programmed to produce a characteristic value representing the numbers of electrons detected at one energy value.

15. The film thickness analyzer of claim 10 in which the processor programmed to receive an output of said electron energy analyzer and produce at least one characteristic value corresponding to inelastically scattered secondary electrons is programmed to produce characteristic values representing the numbers of electrons detected at multiple energy values.

16. The film thickness analyzer of claim 10 in which the processor programmed to receive an output of said electron energy analyzer and produce at least one characteristic value corresponding to inelastically scattered secondary electrons is programmed to produce characteristic values representing the ratio of intensity peaks.

17. A method of measuring a thickness of a film of a first composition formed over a material of a second composition, comprising the steps of:

providing plurality of reference samples, each having a film of said first composition and of known thickness formed a material of said second composition;

for each of said reference samples, irradiating the reference sample by a primary type of radiation having a first energy and measuring a secondary electron spectrum emitted therefrom in an energy region between 10% and 50% lower than said first energy which is dominated by inelastic scattering, thereby obtaining a plurality of reference secondary electron spectra identified with respective film thicknesses;

for a test sample having a film of said first composition formed over a material of said secondary composition, measuring a second electron spectrum emitted therefrom in an energy region between 10% and 50% lower than said first energy by being excited by said type of primary radiation, thereby obtaining a test secondary electron spectrum; and by comparing said test secondary electron spectrum with said reference secondary spectra, determining a thickness of the film of the test sample.

18. The method of claim 17 in which determining a thickness of the film of the test sample includes comparing secondary electron spectra in a region including energies between about 20% and about 30% lower than the first energy.

19. The method of claim 17, wherein the type of primary radiation comprises electrons.

20. The method of claim 19, wherein said energy region extends between 20 and 30% lower than said first energy.

* * * * *